US009463682B2

(12) United States Patent
Suzuki et al.

(10) Patent No.: US 9,463,682 B2
(45) Date of Patent: Oct. 11, 2016

(54) VEHICLE HAVING AIR-CONDITIONING FUNCTION AND DISPLAY FUNCTION

(71) Applicant: Fuji Jukogyo Kabushiki Kaisha, Tokyo (JP)

(72) Inventors: Takahito Suzuki, Tokyo (JP); Tomoyuki Nunome, Tokyo (JP); Tsukasa Mikuni, Tokyo (JP); Makoto Niwa, Tokyo (JP); Isamu Nagasawa, Tokyo (JP)

(73) Assignee: Fuji Jukogyo Kabushiki Kaisha, Shibuya-ku, Tokyo (JP)

( * ) Notice: Subject to any disclaimer, the term of this patent is extended or adjusted under 35 U.S.C. 154(b) by 99 days.

(21) Appl. No.: 14/669,864

(22) Filed: Mar. 26, 2015

(65) Prior Publication Data

US 2015/0273984 A1 Oct. 1, 2015

(30) Foreign Application Priority Data

Mar. 28, 2014 (JP) ................................. 2014-070254

(51) Int. Cl.
  *B60H 1/34* (2006.01)
  *B60H 1/00* (2006.01)
(52) U.S. Cl.
  CPC ........ *B60H 1/3414* (2013.01); *B60H 1/00007* (2013.01); *B60H 1/00985* (2013.01)
(58) Field of Classification Search
  CPC ...................................................... B60H 1/34
  USPC ........................................................ 454/152
  See application file for complete search history.

(56) References Cited

U.S. PATENT DOCUMENTS 5,890,958 A * 4/1999 Greiner ................ B60H 1/3414
                                                      454/155
6,019,676 A * 2/2000 Kim ..................... B60H 3/0608
                                                      454/155

(Continued)

FOREIGN PATENT DOCUMENTS

JP H01-059740 U 4/1989
JP H05-042854 A 2/1993

(Continued)

OTHER PUBLICATIONS

Japanese Office Action dated Jul. 6, 2015 issued in corresponding Japanese Patent Application No. 2014-070254.

(Continued)

*Primary Examiner* — Steven B McAllister
*Assistant Examiner* — Jonathan Cotov
(74) *Attorney, Agent, or Firm* — Troutman Sanders LLP

(57) ABSTRACT

A vehicle includes: a front panel provided in front of an occupant traveling in the vehicle; an air-conditioning duct that forms at least one air outlet, through which a conditioned airflow is blown, in an upper portion of the front panel; a wind direction adjustment member capable of adjusting the conditioned airflow blown out of the air outlet such that the conditioned airflow flows from the air outlet toward the occupant; and at least one display member that displays information to the occupant. The display member is provided in the air-conditioning duct or the air outlet. The wind direction adjustment member is provided so as not to interfere a path between an image displayed by the display member and the occupant.

8 Claims, 12 Drawing Sheets

(56) References Cited

U.S. PATENT DOCUMENTS

| | | | | |
|---|---|---|---|---|
| 6,119,060 A | * | 9/2000 | Takayama | B60K 35/00 307/9.1 |
| 7,201,420 B2 | * | 4/2007 | Vican | B60R 11/0235 296/37.12 |
| 7,650,230 B1 | * | 1/2010 | Laverick | G01C 21/26 361/679.01 |
| 8,142,030 B2 | * | 3/2012 | Bowden | G01C 21/365 348/837 |
| 2007/0265745 A1 | * | 11/2007 | Styles | B60H 1/00985 701/36 |
| 2008/0158510 A1 | * | 7/2008 | Tant | B60K 35/00 353/14 |
| 2009/0132130 A1 | * | 5/2009 | Kumon | B60K 35/00 701/49 |
| 2010/0178861 A1 | * | 7/2010 | Sano | B60H 1/00028 454/127 |
| 2014/0292695 A1 | * | 10/2014 | Wakamoto | G06F 3/1423 345/173 |
| 2015/0197135 A1 | * | 7/2015 | Chen | F25B 21/02 62/3.61 |

FOREIGN PATENT DOCUMENTS

| | | |
|---|---|---|
| JP | H11-051459 A | 2/1999 |
| JP | 2003-160001 A | 6/2003 |
| JP | 2007-069771 A | 3/2007 |
| JP | 2009-190675 | 8/2009 |
| JP | 2013-129410 A | 7/2013 |
| JP | 2013129410 A * | 7/2013 |

OTHER PUBLICATIONS

Decision of Grant dated Nov. 12, 2015 issued in corresponding Japanese Patent Application No. 2014-070254.

* cited by examiner

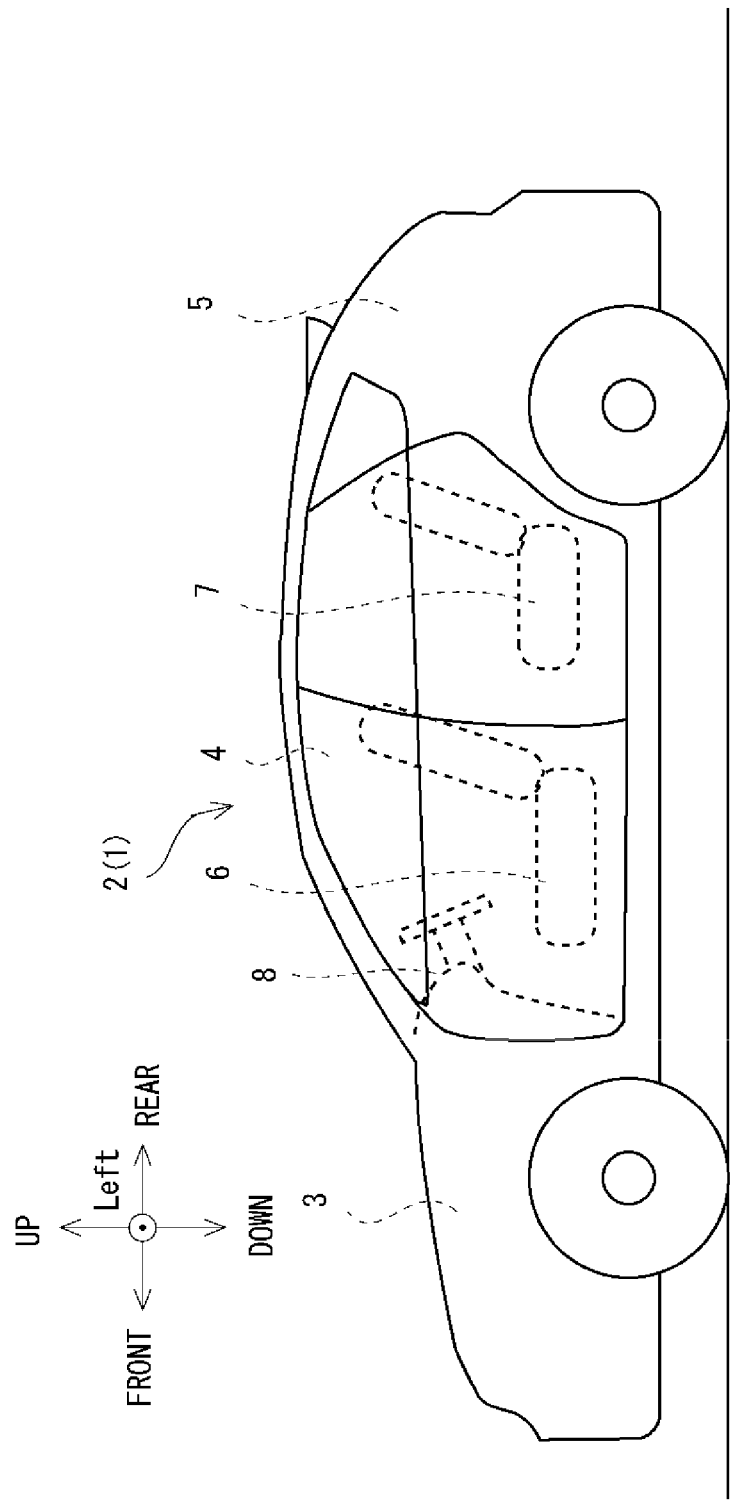

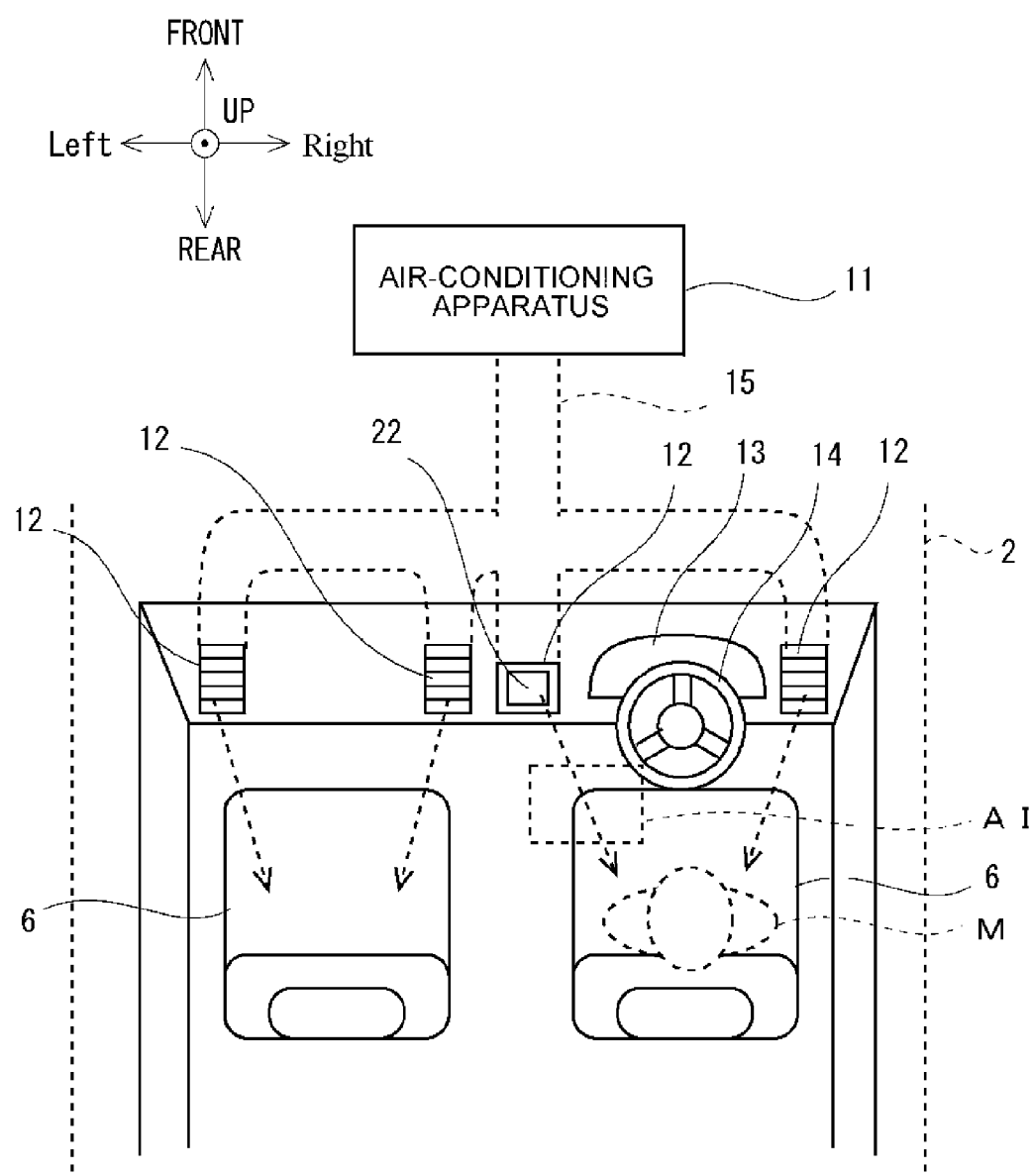

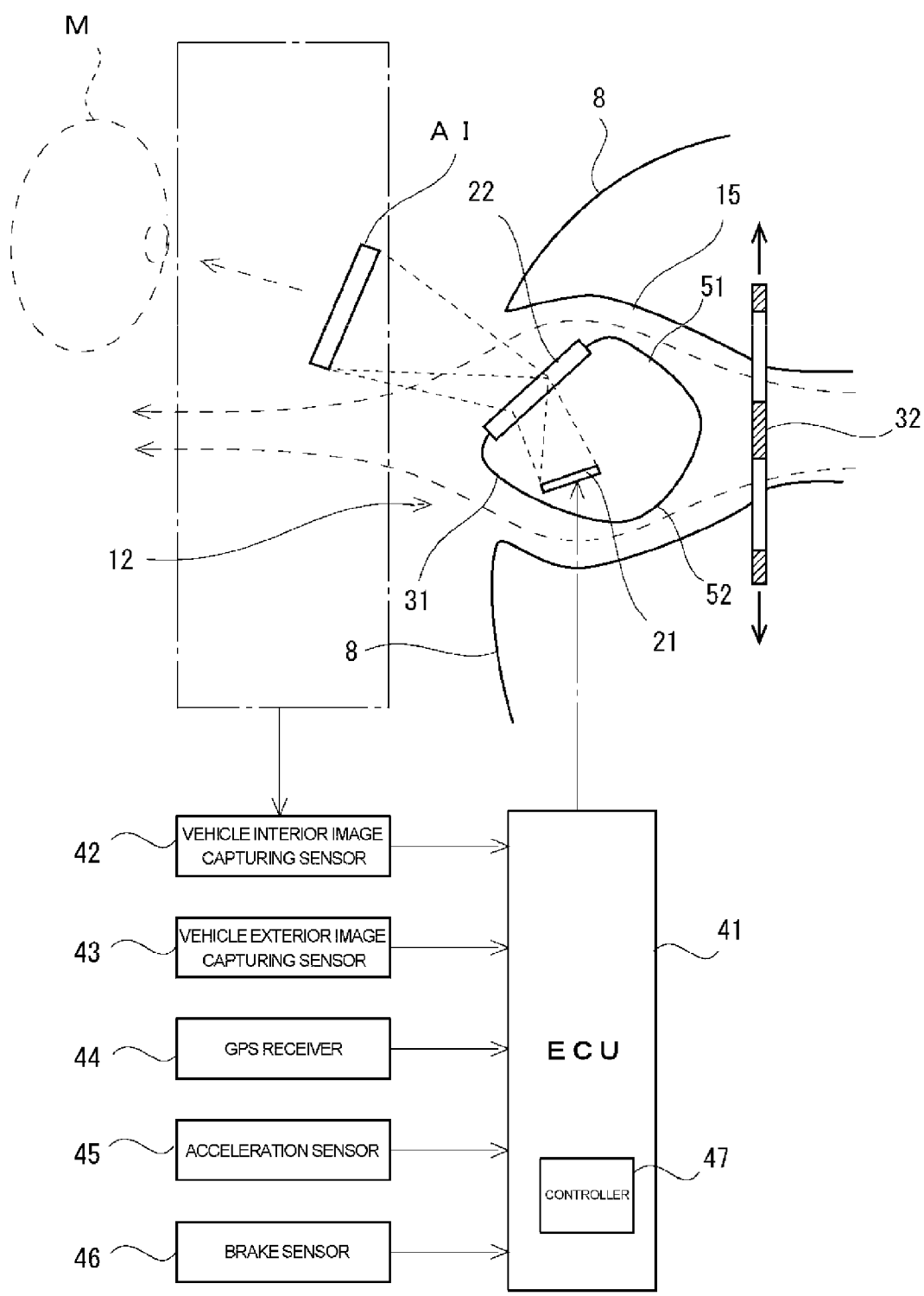

VEHICLE HAVING AIR-CONDITIONING FUNCTION AND DISPLAY FUNCTION

CROSS-REFERENCE TO RELATED APPLICATIONS

The present application claims priority from Japanese Patent Application No. 2014-070254 filed on Mar. 28, 2014, the entire contents of which are hereby incorporated by reference.

BACKGROUND

1. Technical Field

The present invention relates to a vehicle having an air-conditioning function and a display function.

2. Related Art

In recent automobiles and other vehicles, driving assistance systems are used to assist an occupant in driving the vehicle. For example, warnings are issued in relation to foreign objects on a road or an inter-vehicle distance, driving operations are assisted, route guidance to a destination is provided, and driving skills are displayed.

Therefore, although it is sufficient in a conventional vehicle to dispose measuring instruments such as a speedometer and a fuel gauge on a front panel provided in front of the occupant, in recent vehicles it is necessary to provide a display device such as a liquid crystal device, for example, on the front panel so that a large amount of information can be displayed. Moreover, the display device is preferably disposed in an upper portion of the front panel so that the occupant, whose view is oriented frontward above the front panel, can check the information without greatly shifting his/her frontward sightline. Accordingly, a display device disclosed in Japanese Unexamined Patent Application Publication (JP-A) 2009-190675 is likewise disposed in an upper central portion of the front panel. Furthermore, to reinforce a driving assistance function, a screen of a display device installed in a vehicle is preferably increased in size so that a large amount of information can be displayed.

In a vehicle such as an automobile, however, an air outlet through which a conditioned airflow is blown out into an occupant compartment is conventionally provided in the upper portion of the front panel. In a typical automobile, the air outlet is provided in four locations in the upper portion of the front panel, namely left and right locations in front of a driving seat and left and right locations in front of a front passenger seat. As a result, a driver and an occupant in the front passenger seat can each adjust the orientation of slats provided on the left and right air outlets as desired while remaining seated. Since each occupant can adjust the orientation of the conditioned airflow surrounding him/herself, the occupants can travel in comfort.

Hence, in a vehicle such as an automobile, air outlets are provided side by side on the left and right sides of the upper portion of the front panel, and as a result, it is not easy to secure further space in the upper portion of the front panel to dispose a display member such as a display device. In JP-A 2009-190675, therefore, an air outlet in the upper central portion of the front panel is removed, and in its place, a display device is disposed in the upper central portion of the front panel. In this case, a conditioned airflow is no longer blown out from the upper central portion of the front panel, and therefore an air-conditioning function of the vehicle is impaired.

SUMMARY OF THE INVENTION

The present invention has been designed in consideration of the circumstances described above, and an object thereof is to provide this type of vehicle with a display function in an upper portion of a front panel without impairing an air-conditioning function.

An aspect of the present invention provides a vehicle having an air-conditioning function and a display function including: a front panel provided in front of an occupant traveling in the vehicle; an air-conditioning duct that forms an air outlet through which a conditioned airflow is blown in an upper portion of the front panel; a wind direction adjustment member capable of adjusting the conditioned airflow blown out of the air outlet such that the conditioned airflow flows from the air outlet toward the occupant; and a display member that displays information to the occupant, in which the display member is provided in the air-conditioning duct or the air outlet, and the wind direction adjustment member is provided in a position that does not block a display on the display member from the occupant.

The display member may include: a display device that displays an image by emitting light; and a projection panel that is provided at a remove from the display device, and that forms a floating image in a remote position by reflecting light from the image on the display device internally a plurality of times, and the floating image is preferably formed between the air outlet and the occupant.

A holder may be disposed in the air-conditioning duct at a remove from an inner surface of the air-conditioning duct such that the conditioned airflow flows around the holder, and the display member may be provided in the air-conditioning duct or the air outlet by providing at least the projection panel in the holder.

The holder may have a substantially rhomboid sectional shape in which a first wing surface and a second wing surface oppose each other, the first wing surface and the second wing being formed in a projecting curved surface shape projecting in an orthogonal direction to the conditioned airflow flowing through the air-conditioning duct, and the wind direction adjustment member may adjust an orientation of the conditioned airflow blown out of the air outlet by adjusting a balance between the conditioned airflow that flows along the first wing surface and the conditioned airflow that flows along the second wing surface.

The projection panel may reflect light from the image on the display device internally a plurality of times and then transmits the light, and may be provided in a lying condition relative to the conditioned airflow on an air outlet side surface of the holder having the substantially rhomboid sectional shape. The display device may be disposed in a lying condition relative to the conditioned airflow on a lower side of the projection panel.

The wind direction adjustment member may include at least one of: a movable plate provided in the air-conditioning duct or the air outlet to be capable of moving so as to vary a projection surface area intersecting the conditioned airflow, and a sub-duct that communicates with the air-conditioning duct or forms an opening in a part of the front panel surrounding the air outlet, and that suctions or blows out an airflow.

The projection panel may be provided in a position behind the air outlet as a part of the inner surface of the air-conditioning duct, and the display device is preferably disposed in the front panel in alignment with the projection panel.

The wind direction adjustment member may include at least one of: a movable plate provided in the air-conditioning duct or the air outlet to be capable of moving so as to vary a projection surface area intersecting the conditioned airflow, and a sub-duct that communicates with the air-condi-

BRIEF DESCRIPTION OF THE DRAWINGS

FIG. 1 is a side view illustrating an automobile according to a first implementation of the present invention;

FIG. 2 schematically illustrates an interior and an air-conditioning facility of the automobile illustrated in FIG. 1;

FIG. 3 schematically illustrates a cross-section of an outlet part provided in an upper central portion of a front panel illustrated in FIG. 2, and an operating apparatus having a display function;

DETAILED DESCRIPTION

Figure 4A:
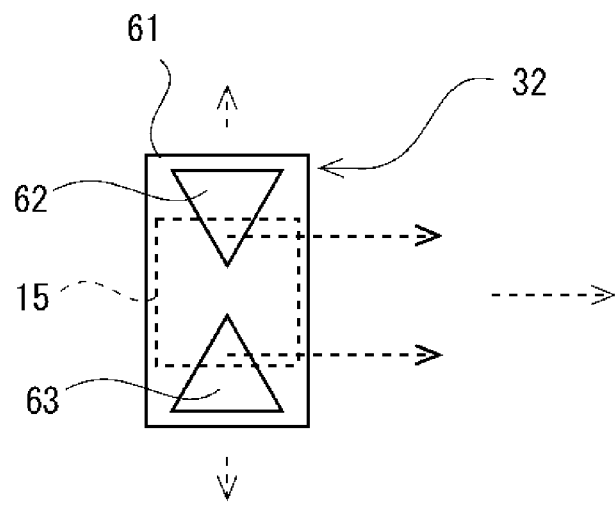
FIGS. 4A-4C schematically illustrate a wind direction adjustment function of a wind direction adjustment member illustrated in FIG. 3.

Implementations of the present invention will be described below with reference to the drawings.

[First Implementation]

FIG. 1 is a side view illustrating an automobile 1 according to a first implementation of the present invention.

FIG. 2 schematically illustrates an interior and an air-conditioning facility of the automobile 1 illustrated in FIG. 1.

The automobile 1 of FIG. 1 is an example of a vehicle having an air-conditioning function and a display function. The automobile 1 may be, for example, a gasoline automobile that uses an internal combustion engine, an electric automobile, or a hybrid automobile combining a gasoline automobile and an electric automobile.

The automobile 1 includes a vehicle body 2. The vehicle body 2 is divided by a frame serving as a skeleton thereof into a front compartment 3, an occupant compartment 4, and a luggage compartment 5. An engine and a motor, for example, are disposed in the front compartment 3. Front seats 6 and rear seats 7 on which occupants sit are disposed in front and rear rows in the occupant compartment 4. A spare tire, a battery, and so on can be housed in the luggage compartment 5.

Further, a front panel 8 is disposed in the occupant compartment 4 in front of the front seats 6.

As illustrated in FIG. 2, air outlets 12 that blow out a conditioned airflow generated by an air-conditioning apparatus 11, gauges 13 such as a speedometer, a steering wheel 14, and so on are provided in an upper portion of the front panel 8. The air outlets 12 are disposed in the upper portion of the front panel 8 in left and right locations in front of a left side front seat 6 and left and right locations in front of a right side front seat 6. The air outlets 12 are connected to the air-conditioning apparatus 11 by an air-conditioning duct 15. The conditioned airflow passes through the air-conditioning duct 15 from the air-conditioning apparatus 11, and is blown out of the air outlets 12 into the occupant compartment 4. Slats for adjusting a blowing direction of the conditioned airflow blown out of the air outlets 12 are disposed on each of the air outlets 12.

An occupant such as a driver M sits in the front seat 6. The front panel 8 is provided in front of the occupant sitting in the vehicle. The occupant can operate various switches provided on the front panel 8 and the slats of the air outlets 12 by extending an arm toward the front panel 8 while remaining seated. The occupant can adjust the conditioned airflow blown out of the respective air outlets 12 so as to orient the conditioned airflow from the air outlets 12 toward him/herself, for example.

Further, the driver M can drive the vehicle while checking conditions outside and in front of the vehicle through a windshield provided above the front panel 8, for example, and while remaining seated in the front seat 6.

Incidentally, in recent automobiles such as the automobile 1, driving assistance systems are used to assist driving of the automobile 1 by the driver M. For example, warnings are issued in relation to foreign objects on a road or an inter-vehicle distance, driving operations are assisted, route guidance to a destination is provided, and driving skills are displayed.

Therefore, although it is sufficient in a conventional automobile such as the automobile 1 to dispose the gauges 13 such as the speedometer and a fuel gauge on the front panel 8 provided in front of the occupant, in recent automobiles such as the automobile 1 it is necessary to provide a display device such as a liquid crystal device, for example, on the front panel 8 so that images of a large amount of information can be displayed. Moreover, the display device is preferably disposed in the upper portion of the front panel 8 so that the occupant, whose view is oriented frontward above the front panel 8, can check the information without greatly shifting his/her frontward sightline. Furthermore, to reinforce a driving assistance function, a screen of the display device installed in the vehicle is preferably increased in size so that a large amount of information can be displayed.

In a vehicle such as the automobile 1, however, the air outlets 12 and so on through which the conditioned airflow is blown out into the occupant compartment 4 are conventionally provided in the upper portion of the front panel 8. In a typical automobile such as the automobile 1, as described above, the air outlets 12 are provided in four locations in the upper portion of the front panel 8, namely left and right locations in front of the right side front seat 6 and left and right locations in front of the left side front seat 6. As a result, the driver M and the occupant can each adjust the orientation of the slats of the left and right air outlets 12 as desired while remaining seated. Since each occupant can adjust the orientation of the conditioned airflow surrounding him/herself, the occupants can travel in comfort.

Hence, in a vehicle such as the automobile 1, the air outlets 12 are provided side by side on the left and right sides of the upper portion of the front panel 8, and as a result, it is not easy to secure further space in the upper portion of the front panel 8 to dispose a display device. For example, the air outlet 12 in an upper central portion of the front panel 8 must be removed, and in its place, the display device must be disposed in the upper central portion of the front panel 8. In this case, a conditioned airflow is no longer blown out from the upper central portion of the front panel 8, and therefore an air-conditioning function of the automobile 1 is impaired.

It is therefore desirable to provide the automobile 1 with a display function in the upper portion of the front panel 8 without impairing the air-conditioning function. In other words, it is desirable to provide a display function in the upper portion of the front panel 8, where arrangement and size limitations exist, preferentially over the air outlets 12.

Hence, in this implementation, as illustrated in FIG. 2, the slats of the air outlet 12 are removed, and a display member is provided in the air-conditioning duct 15 or the air outlet 12. Further, a wind direction adjustment member for adjusting the blowing direction of the conditioned airflow is provided so as not to block a path between the display member and the occupant. In so doing, the conditioned air outlets 12 and the display member can be provided together in the upper portion of the front panel 8. The display member can be provided in the upper portion of the front panel 8 while setting the size, number, and positions of the conditioned air outlets 12 in the upper portion of the front panel 8 appropriately. Even when the display member is large, the conditioned air outlets 12 can be provided together with the large display member in the upper portion of the front panel 8. The occupant can therefore check display information displayed close to his/her sightline safely without turning fully away from the vehicle exterior above the front panel 8. Further, there is no need to provide the conditioned air outlets 12 and a display device 21 side by side, and therefore an improvement in design freedom can be obtained in relation to the upper portion of the front panel 8.

This will now be described in detail.

FIG. 3 is schematically illustrates a cross-section of an outlet part provided in an upper central portion of the front panel 8 illustrated in FIG. 2, and an operating apparatus having a display function.

The cross-section in FIG. 3 illustrates the air outlet 12 opening onto the upper portion of the front panel 8, the air-conditioning duct 15 communicating with the air outlet 12, a holder 31 that holds the display device 21 and a projection panel 22 inside the air-conditioning duct 15, and a movable plate 32 provided in the air-conditioning duct 15 behind the holder 31.

Further, FIG. 3 illustrates various sensors and an engine control unit (ECU) 41 as members that control display by the display device 21. More specifically, FIG. 3 illustrates a vehicle interior image capturing sensor 42, a vehicle exterior image capturing sensor 43, a global positioning system (GPS) receiver 44, an acceleration sensor 45, and a brake sensor 46.

The display device 21 is a liquid crystal device, for example. The display device 21 displays images by emitting light. The display device 21 is disposed in the holder 31.

The projection panel 22 is provided at a remote from the display device 21, and forms a floating image AI in a remote position by reflecting light from an image on the display device 21 internally a plurality of times.

The projection panel 22 refracts and then transmits or reflects the image on the display device 21. The projection panel 22 is formed by incorporating a double reflector structure into a transparent glass plate, for example. The projection panel 22 is exposed to an outer surface of the holder 31 and provided at a remove from the display device 21.

Hence, as illustrated in FIG. 3, an identical floating image AI to the image on the display device 21 is formed in a position removed from the holder 31. The floating image AI is formed in a remote position between the air outlet 12 and the occupant on a path extending from the air outlet 12 to the driver M.

The vehicle interior image capturing sensor 42 is a charge coupled device (CCD) sensor that captures images inside the occupant compartment 4, for example. The vehicle interior image capturing sensor 42 is provided so as to be oriented downward from a ceiling of the occupant compartment 4, for example. The vehicle interior image capturing sensor 42 captures images of hand or finger movements made by the driver M within a range surrounded by a dot-dash line in FIG. 3. The images of the vehicle interior captured by the vehicle interior image capturing sensor 42 can be used to detect the existence and content of operations performed by the occupant, for example.

The vehicle exterior image capturing sensor 43 is a complementary metal oxide silicon (CMOS) sensor that captures images frontward of an upper portion of the windshield. Images of the vehicle exterior captured by the vehicle exterior image capturing sensor 43 can be used to detect obstructions and the like on a travel route, for example.

The GPS receiver 44 receives GPS radio waves from an artificial satellite. The GPS receiver 44 is capable of generating information indicating a position of the automobile 1 on the basis of position and time information included in GPS radio waves from artificial satellites.

The acceleration sensor 45 is a strain sensor capable of expanding in front-rear, left-right, and up-down directions, for example. An advancement direction and acceleration/deceleration of the automobile 1 can be estimated from the acceleration detected by the acceleration sensor 45.

The brake sensor 46 detects the existence of a brake pedal operation performed by the driver M, for example. As a result, a condition of the operations performed by the driver M can be learned.

The ECU 41 is a computer apparatus. The various sensors and the display device 21 are connected to the ECU 41. The computer apparatus includes a memory and a central processing unit (CPU). The CPU realizes a controller 47 of the automobile 1 by executing programs stored in the memory. The controller 47 controls the engine, the motor, and the brake, for example, of the automobile 1. The controller 47 executes control for assisting driving of the automobile 1, and outputs image data to the display device 21.

The display device 21 displays images on the basis of the image data input from the ECU 41. For example, the display device 21 displays warning images indicating a foreign object on the road or the inter-vehicle distance, images for assisting the driving operation, images providing route guidance to a destination, and images for improving the driving operation. The images are formed as the floating image AI in a position between the air outlet 12 and the occupant.

Further, the controller 47 displays setting images relating to the automobile 1 or in-vehicle devices on the display device 21. The controller 47 detects an operation performed by the driver M in relation to the floating image AI on the basis of the images captured by the vehicle interior image capturing sensor 42. The controller 47 then controls the automobile 1 or the in-vehicle devices by switching the floating image AI on the basis of the detected operation.

As a result, the driver M can view the floating image AI displayed in front of the air outlet 12 in the upper portion of the front panel 8 while remaining in a driving attitude seated in the front seat 6 and without greatly shifting his/her frontward sightline. Further, the driver M can operate the automobile 1 or the in-vehicle devices by performing an operation in relation to the floating image AI displayed in front of the upper portion of the front panel 8 while remaining in the driving attitude seated in the front seat 6.

Next, an air-conditioning function will be described.

The holder 31 is disposed at a remove from an inner surface of the air-conditioning duct 15 in a part of the air-conditioning duct 15 closest to the air outlet 12. A part of the holder 31 may project from the air outlet 12.

As illustrated by the longitudinal section in FIG. 3, the holder 31 includes a first wing surface 51 and a second wing surface 52 that extend through the air-conditioning duct 15 in a flow direction of the conditioned airflow. The first wing surface 51 has a curved surface shape such that a central portion thereof in the airflow direction projects upward. The second wing surface 52 is shaped such that a central portion thereof in the airflow direction projects downward. An airflow direction upstream end of the first wing surface 51 is mated to an airflow direction upstream end of the second wing surface 52, and an airflow direction downstream end of the first wing surface 51 is mated to an airflow direction downstream end of the second wing surface 52. As a result, the holder 31 is formed with an outer shape having a substantially rhomboid longitudinal section. The projection panel 22 is disposed on an upper surface of the rhomboid cross-section on a downstream side in the airflow direction. The display device 21 is disposed below the projection panel 22.

The part of the air-conditioning duct 15 closest to the air outlet 12 is likewise formed in a shape having a substantially rhomboid longitudinal section extending along the inner surface of the air-conditioning duct 15 and the outer shape of the holder 31.

The holder 31 having a substantially rhomboid outer surface obtained by opposing the first wing surface 51 and the second wing surface 52 is provided in the air-conditioning duct 15 at a remove from the inner surface of the air-conditioning duct 15, and therefore, in FIG. 3, the conditioned airflow flowing through the air-conditioning duct 15 is divided into an upper side airflow and a lower side airflow. The upper side airflow flows along the wing surface shape of the first wing surface 51, and flows toward the air outlet 12 above the first wing surface 51. The lower side airflow flows along the wing surface shape of the second wing surface 52, and flows toward the air outlet 12 below the second wing surface 52. The upper side airflow and the lower side airflow converge in the air outlet 12 and are then blown out through the air outlet 12. Thus, a single conditioned airflow can be blown out of the air outlet 12.

Note that here, the flow of the conditioned airflow in a case where the holder 31 is formed with an outer shape having a substantially rhomboid longitudinal section was described, but a single conditioned airflow can be blown out of the air outlet 12 similarly in a case where the holder 31 is formed with an outer shape having a substantially rhomboid lateral section.

Next, wind direction adjustment of the single conditioned airflow blown out of the air outlet 12 will be described.

Figure 4B:
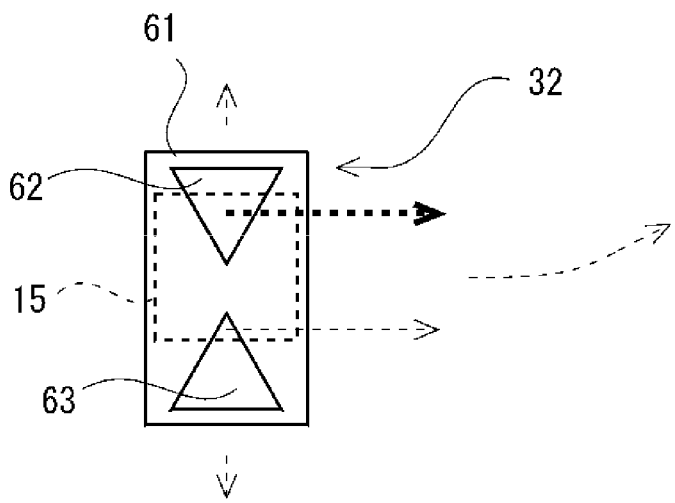
Figure 4C:
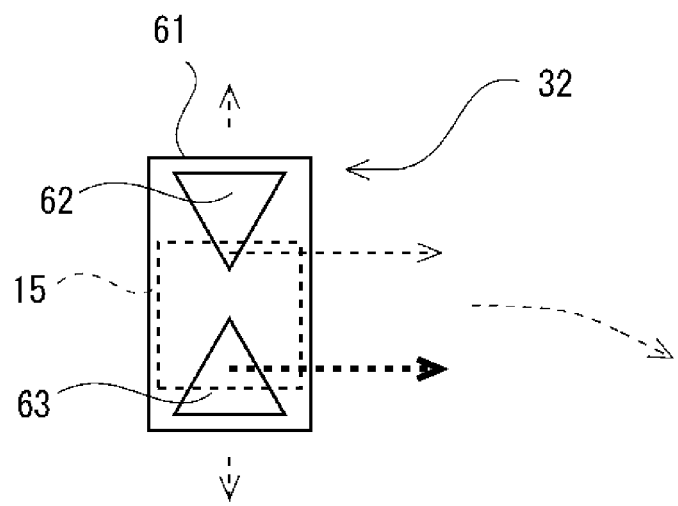

FIGS. 4A-4C schematically illustrate a wind direction adjustment function of a wind direction adjustment member illustrated in FIG. 3.

FIGS. 4A-4C illustrate the movable plate 32 and the air-conditioning duct 15. FIGS. 4A-4C illustrate a position of the movable plate 32 in the air-conditioning duct 15 from the air outlet 12 side.

The movable plate 32 is a wind direction adjustment member capable of moving in a perpendicular direction to the flow direction of the conditioned airflow through the air-conditioning duct 15. The movable plate 32 can be moved by an occupant operation, for example. The movable plate 32 may be configured to be capable of moving in response to an occupant operation of a motor, not illustrated in the drawing, for example.

The movable plate 32 includes an elongated plate 61 that is elongated in an up-down direction, and an upper triangular hole 62 and a lower triangular hole 63 formed respectively in upper and lower portions of the elongated plate 61. The upper triangular hole 62 is formed in the upper portion of the elongated plate 61 such that an apex is oriented downward and a perpendicular bisector is aligned with a lengthwise direction of the elongated plate 61. The lower triangular hole 63 is formed in the lower portion of the elongated plate 61 such that the apex is oriented upward and the perpendicular bisector is aligned with the lengthwise direction of the elongated plate 61. The upper triangular hole 62 and the lower triangular hole 63 are formed such that the respective apexes thereof oppose each other on the elongated plate 61.

The movable plate 32 is disposed to overlap the air-conditioning duct 15 having a substantially square cross-section. The movable plate 32 can be moved up and down in FIG. 4 by an occupant operation.

As illustrated in FIG. 4A, when a central part of the movable plate 32 overlaps the air-conditioning duct 15, a lower half of the upper triangular hole 62 and an upper half of the lower triangular hole 63 overlap the air-conditioning duct 15. Hence, substantially identically sized openings are formed in upper and lower portions of the air-conditioning duct 15. As a result, substantially identical amounts of airflow flow above and below the holder 31. After converging at the air outlet 12, the conditioned airflow flows in a frontward direction through the air outlet 12.

When the movable plate 32 is moved downward, as illustrated in FIG. 4B, the upper part of the movable plate 32 overlaps the air-conditioning duct 15. Accordingly, substantially the entire upper triangular hole 62 and the apex part of the lower triangular hole 63 overlap the air-conditioning duct 15. Hence, a larger opening is formed in the upper portion of the air-conditioning duct 15 than in the lower portion. As a result, a larger amount of airflow flows above the holder 31 than below, and the upper side airflow flows faster than the lower side airflow. After converging at the air outlet 12, the conditioned airflow is pulled by the faster upper side airflow so as to flow in an upward direction through the air outlet 12.

When the movable plate 32 is moved upward, as illustrated in FIG. 4C, the lower part of the movable plate 32 overlaps the air-conditioning duct 15. Accordingly, the apex part of the upper triangular hole 62 and substantially the entire lower triangular hole 63 overlap the air-conditioning duct 15. Hence, a larger opening is formed in the lower portion of the air-conditioning duct 15 than in the upper portion. As a result, a larger amount of airflow flows below the holder 31 than above, and the lower side airflow flows faster than the upper side airflow. After converging at the air outlet 12, the conditioned airflow is pulled by the faster lower side airflow so as to flow in a downward direction through the air outlet 12.

By adjusting the vertical position of the movable plate 32 disposed behind the holder 31 in this manner, a balance between the conditioned airflow flowing along the first wing surface 51 of the holder 31 and the conditioned airflow flowing along the second wing surface 52 can be adjusted, and as a result, the orientation of the conditioned airflow blown out of the air outlet 12 can be adjusted.

Note that here, a case in which the conditioned airflow is adjusted in the up-down direction by disposing the elongated movable plate 32 vertically and adjusting the position thereof vertically was described, but the elongated movable plate 32 may be disposed in a left-right direction so that the conditioned airflow can be adjusted in the left-right direction by adjusting the position of the movable plate 32 to the left and right.

In this implementation, as described above, the display member constituted by the display device 21 and the projection panel 22 is provided in the air-conditioning duct 15 or the air outlet 12, as illustrated in FIG. 3. Therefore, the conditioned air outlet 12 and the display member can be provided together in the upper portion of the front panel 8, as illustrated in FIG. 2. Hence, the display member can be provided in the upper portion of the front panel 8 while setting the size and position of the conditioned air outlet 12 in the upper portion of the front panel 8 appropriately. Even when the display member is large, the conditioned air outlet 12 can be provided together with the large display member in the upper portion of the front panel 8.

The occupant can therefore check information displayed in the air close to his/her sightline safely without shifting the sightline greatly from the vehicle exterior above the front panel 8.

Further, there is no need to provide the conditioned air outlet 12 and the display device side by side, and therefore an improvement in design freedom can be obtained in relation to the upper portion of the front panel 8.

Furthermore, the movable plate 32 serving as the wind direction adjustment member is provided in a position that does not block the display on the display device from the occupant. The orientation of the conditioned airflow blown out of the air outlet 12 can be adjusted using the movable plate 32. Hence, the conditioned air outlet 12 and the display device 21 can coexist in the upper portion of the front panel 8 without impairing the wind direction adjustment function of the air-conditioning facility.

Moreover, in this implementation, the floating image AI can be formed and displayed by the display device 21 and the projection panel 22 in front of the conditioned air outlet 12 provided in the upper portion of the front panel 8 when seen from the occupant. As a result, information can be displayed in front of the conditioned air outlet 12 without obstructing the conditioned airflow flowing from the conditioned air outlet 12 toward the occupant.

When, on the other hand, the display device 21 is disposed in front of the conditioned air outlet 12, for example, the conditioned airflow is obstructed by the display device 21. According to this implementation, however, this situation does not arise.

Furthermore, in this implementation, the holder 31 is disposed in the air-conditioning duct 15 at a remove from the inner surface of the air-conditioning duct 15, and the display device 21 and projection panel 22 are provided in the holder 31. Hence, the display device 21 and the projection panel 22 can be provided in the air-conditioning duct 15. Moreover, the conditioned airflow can be blown out from the periphery of the holder 31 disposed in the air-conditioning duct 15.

Further, in this implementation, the holder 31 is formed to have a substantially rhomboid sectional shape by forming the first wing surface 51 and the second wing surface 52 on the upper and lower sides of the holder 31 in a projecting curved surface shape projecting in an orthogonal direction to the conditioned airflow flowing through the air-conditioning duct 15. As a result, the balance between the conditioned airflow flowing along the first wing surface 51 and the conditioned airflow flowing along the second wing surface 52 can be adjusted using the movable plate 32.

Hence, the two conditioned airflows flowing separately above and below the holder 31 disposed in the air-conditioning duct 15 can be combined into a single conditioned airflow and thus blown out of the air-conditioning duct 15.

Furthermore, the blowing direction of the single conditioned airflow can be adjusted using the movable plate 32.

Moreover, in this implementation, the projection panel 22 reflects light from an image on the display device 21 internally a plurality of times and then transmits the light, and is provided in a lying condition relative to the conditioned airflow on the air outlet 12 side surface of the holder 31 having a substantially rhomboid sectional shape. The display device 21 is likewise disposed in a lying condition relative to the conditioned airflow below the projection panel 22.

Hence, even when the display device 21 and the projection panel 22 are increased in size, the large display member can be laid flat and disposed thus in the air-conditioning duct 15. As a result, an increase in the size of the air outlet 12 can be suppressed.

Further, the display device 21 and projection panel 22 that display the floating image AI can be provided in the holder 31 so as not to impair the outer shape of the holder 31, which has a substantially rhomboid sectional shape so that a single conditioned airflow can be blown out.

Figure 5:
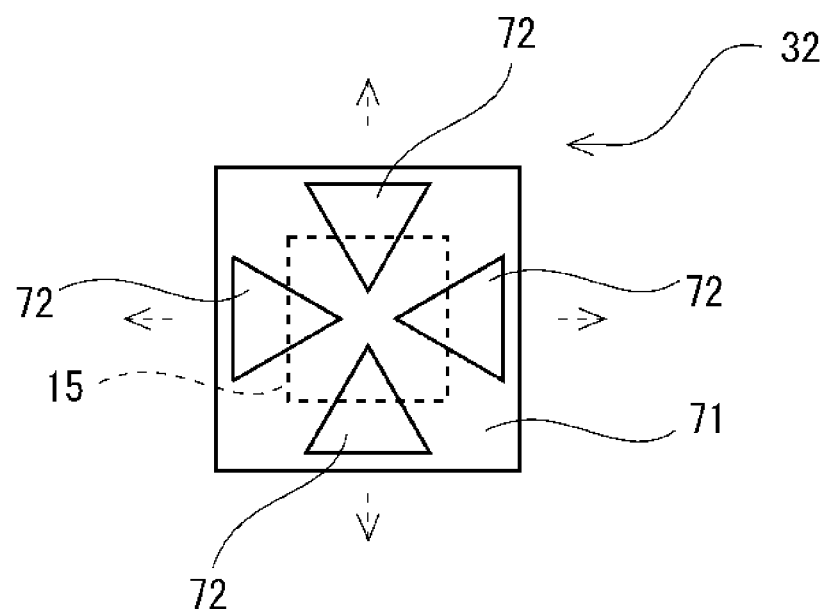
FIG. 5 illustrates a modified example of a movable plate illustrated in FIGS. 4A-4C.

FIG. 5 schematically illustrates a modified example of the movable plate 32 illustrated in FIG. 4.

In the movable plate 32 of FIG. 5, triangular holes 72 are formed in a substantially square plate 71. The triangular holes 72 are formed on respective sides of the substantially square plate 71 such that the apexes thereof are oriented toward the center. The two triangular holes 72 on the upper and lower sides are formed such that the apexes thereof oppose each other. The two triangular holes 72 on the left and right sides are formed such that the apexes thereof oppose each other. The movable plate 32 is provided to be capable of moving in the up-down direction and the left-right direction relative to the air-conditioning duct 15.

Hence, the conditioned airflow can be adjusted in the up-down direction and the left-right direction using the position of the movable plate 32.

Note that the holes formed in the movable plate 32 do not have to be triangular. Likewise when rectangular holes are formed in the movable plate 32, for example, the conditioned airflow can be adjusted in the up-down direction and the left-right direction by moving the movable plate 32 in the up-down direction or the left-right direction.

Figure 6:
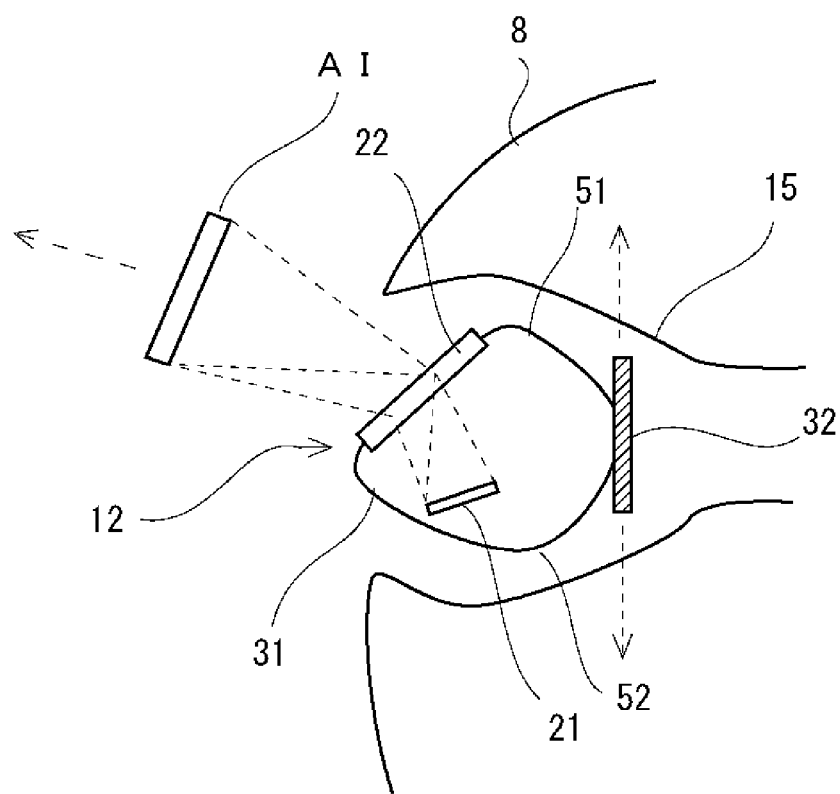
FIG. 6 schematically illustrates a first modified example of the outlet part provided in the upper central portion of the front panel illustrated in FIG. 3.

FIG. 6 schematically illustrates a first modified example of the outlet part provided in the upper central portion of the front panel 8 illustrated in FIG. 3.

In FIG. 6, the movable plate 32 serving as the wind direction adjustment member is provided in the holder 31 having a substantially rhomboid cross-section. The movable plate 32 is positioned behind the projection panel 22. Likewise in this case, the conditioned airflow can be adjusted in the up-down direction by moving the movable plate 32 up and down.

Figure 7:
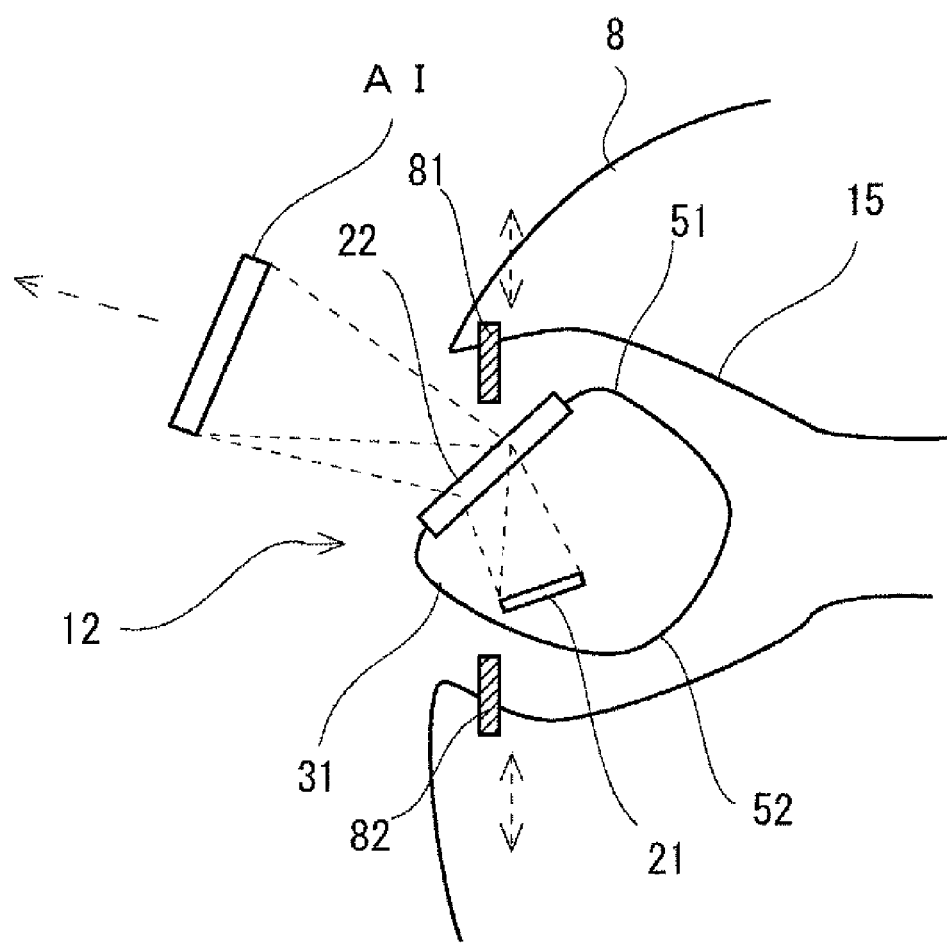
FIG. 7 schematically illustrates a second modified example of the outlet part provided in the upper central portion of the front panel illustrated in FIG. 3.

FIG. 7 schematically illustrates a second modified example of the outlet part provided in the upper central portion of the front panel 8 illustrated in FIG. 3.

In FIG. 7, a first movable plate 81 and a second movable plate 82 are provided in positions adjacent to the air outlet 12 in the air-conditioning duct 15. The first movable plate 81 is provided on the upper side of the holder 31 to be capable of moving in the up-down direction. The second movable plate 82 is provided on the lower side of the holder 31 to be capable of moving in the up-down direction. The first movable plate 81 and the second movable plate 82 are provided to be capable of moving up and down within a range that does not block a central part of the air outlet 12. As a result, the path extending from the projection panel 22 to the occupant is not blocked.

Figure 8:
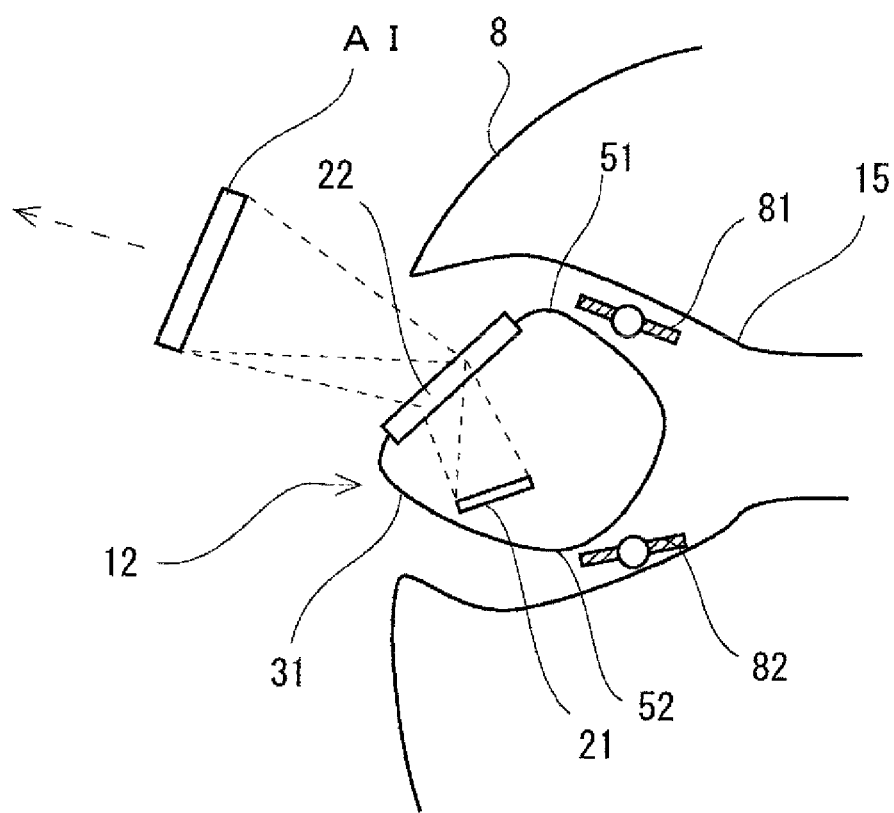
FIG. 8 schematically illustrates a third modified example of the outlet part provided in the upper central portion of the front panel illustrated in FIG. 3.

FIG. 8 schematically illustrates a third modified example of the outlet part provided in the upper central portion of the front panel 8 illustrated in FIG. 3.

In FIG. 8, the first movable plate 81 and the second movable plate 82 are provided above and below the holder 31. The first movable plate 81 is provided to be capable of rotating between the first wing surface 51 of the holder 31 and the inner surface of the air-conditioning duct 15. The second movable plate 82 is provided to be capable of rotating between the second wing surface 52 of the holder 31 and the inner surface of the air-conditioning duct 15. The first movable plate 81 and the second movable plate 82 may be operated independently or individually. Likewise in this case, the balance between the airflow flowing above the first wing surface 51 and the airflow flowing below the second wing surface 52 can be adjusted using the first movable plate 81 and the second movable plate 82, and as a result, the conditioned airflow can be adjusted in the up-down direction.

Note that a rotatable movable plate 32 may be provided in a position behind the holder 31 or a position close to the air outlet 12.

Further, the movable plates 32, 81, 82 of FIG. 3 and FIGS. 6 to 8 may be combined and provided in the air-conditioning duct 15 or the air outlet 12.

[Second Implementation]

Next, an example in which the orientation of the conditioned airflow is adjusted using a different method to the first implementation will be described.

The following description focuses mainly on differences with the first implementation.

Figure 9:
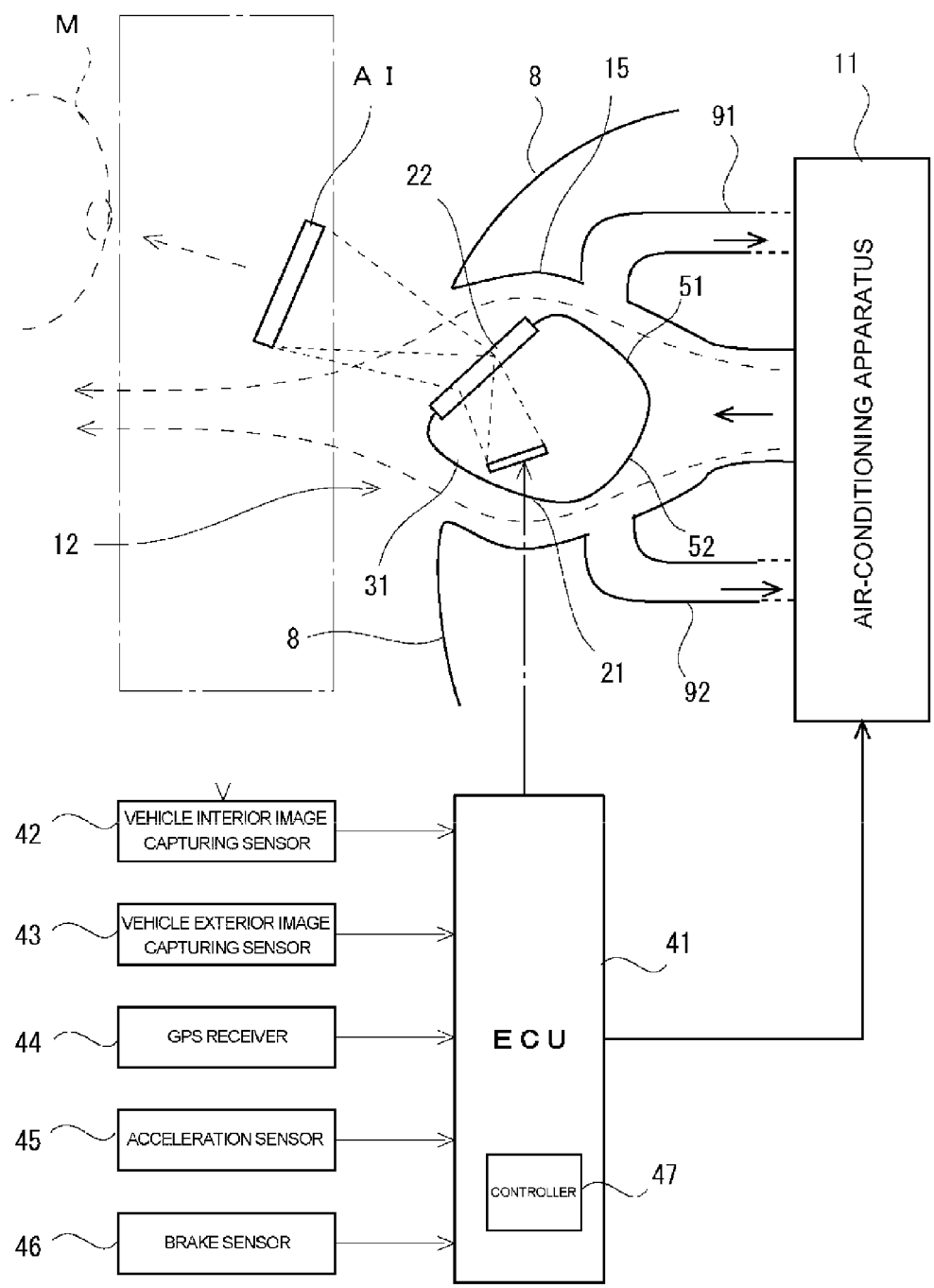
FIG. 9 schematically illustrates an air-conditioning facility provided in a front panel according to a second implementation of the present invention.

FIG. 9 schematically illustrates an air-conditioning facility provided in the front panel 8 according to a second implementation of the present invention.

A cross-section in FIG. 9 illustrates an upper sub-duct 91 and a lower sub-duct 92 connected between the air-conditioning duct 15 and the air-conditioning apparatus 11. The upper sub-duct 91 is joined to the air-conditioning duct 15 in a position above the holder 31, and the lower sub-duct 92 is joined to the air-conditioning duct 15 in a position below the holder 31.

The air-conditioning apparatus 11 outputs conditioned airflows to the air-conditioning duct 15, the upper sub-duct 91, and the lower sub-duct 92 individually. Further, the air-conditioning apparatus 11 is capable of suctioning the conditioned airflow in the air-conditioning duct 15 through the upper sub-duct 91 and the lower sub-duct 92 individually.

The ECU 41 detects an air-conditioner operation performed by the driver M on the basis of an image captured by the vehicle interior image capturing sensor 42, for example, and outputs a control signal to the air-conditioning apparatus 11. The air-conditioning apparatus 11 controls the airflows in the upper sub-duct 91 and the lower sub-duct 92 on the basis of a wind direction adjustment control signal.

For example, when the conditioned airflow is to be output in the frontward direction through the air outlet 12, the air-conditioning apparatus 11 closes the upper sub-duct 91 and the lower sub-duct 92. As a result, the conditioned airflow output to the air-conditioning duct 15 by the air-conditioning apparatus 11 is divided substantially evenly into upper and lower airflows on the upstream side of the holder 31, and then converges on the downstream side of the holder 31. The converged airflow flows out of the air outlet 12 in the frontward direction of the air outlet 12.

When the conditioned airflow is to be output in the upward direction through the air outlet 12, the air-conditioning apparatus 11 closes the upper sub-duct 91 and suctions the airflow from the lower sub-duct 92, for example. As a result, the amount of airflow flowing on the lower side of the holder 31 decreases relative to the upper side, and the upper side airflow becomes faster than the lower side. Hence, after converging at the air outlet 12, the conditioned airflow is pulled by the faster upper side airflow so as to flow through the air outlet 12 in the upward direction.

When the conditioned airflow is to be output in the downward direction from the air outlet 12, the air-conditioning apparatus 11 suctions the airflow from the upper sub-duct 91 and closes the lower sub-duct 92, for example. As a result, the amount of airflow flowing on the upper side of the holder 31 decreases relative to the lower side, and the lower side airflow becomes faster than the upper side. Hence, after converging at the air outlet 12, the conditioned airflow is pulled by the faster lower side airflow so as to flow through the air outlet 12 in the downward direction.

Note that when the blowing direction of the airflow is to be adjusted further in the up-down direction, instead of closing the upper sub-duct 91 or the lower sub-duct 92, an airflow may be blown out through the upper sub-duct 91 or the lower sub-duct 92 to be closed. In so doing, a difference between the amounts of airflow flowing above and below the holder 31 can be increased, leading to an increase in a speed difference between the airflows flowing above and below the holder 31, and as a result, a vertical angle of the airflow blowing direction relative to the frontward direction of the air outlet 12 can be increased.

In this implementation, as described above, the balance between the conditioned airflow flowing along the first wing surface 51 of the holder 31 and the conditioned airflow flowing along the second wing surface 52 can be adjusted using the upper sub-duct 91 and the lower sub-duct 92 disposed above and below the holder 31 so as to communicate with the air-conditioning duct 15, and as a result, the orientation of the conditioned airflow can be adjusted in a similar manner to the first implementation. With this implementation, therefore, similar effects to the first implementation can be obtained.

Note that here, a case in which the conditioned airflow is adjusted in the up-down direction by joining the upper sub-duct 91 and the lower sub-duct 92 to the upper and lower sides of the holder 31 was described, but instead, the conditioned airflow may be adjusted in the left-right direction by joining the sub-ducts to the left and right sides of the holder 31.

Further, the positions in which the sub-ducts are joined to the air-conditioning duct 15 are not limited to the upper, lower, left, and right sides of the holder 31, and the sub-ducts may also be joined to the air-conditioning duct 15 behind the holder 31. Furthermore, the sub-ducts may be joined to the air-conditioning duct 15 in the vicinity of the air outlet 12. Alternatively, sub-ducts may be joined to the air-conditioning duct 15 side by side in the flow direction of the airflow.

Moreover, the orientation of the conditioned airflow may be adjusted by combining the movable plates 32, 81, 82 according to the first implementation with the sub-ducts 91, 92 according to this implementation.

Figure 10:
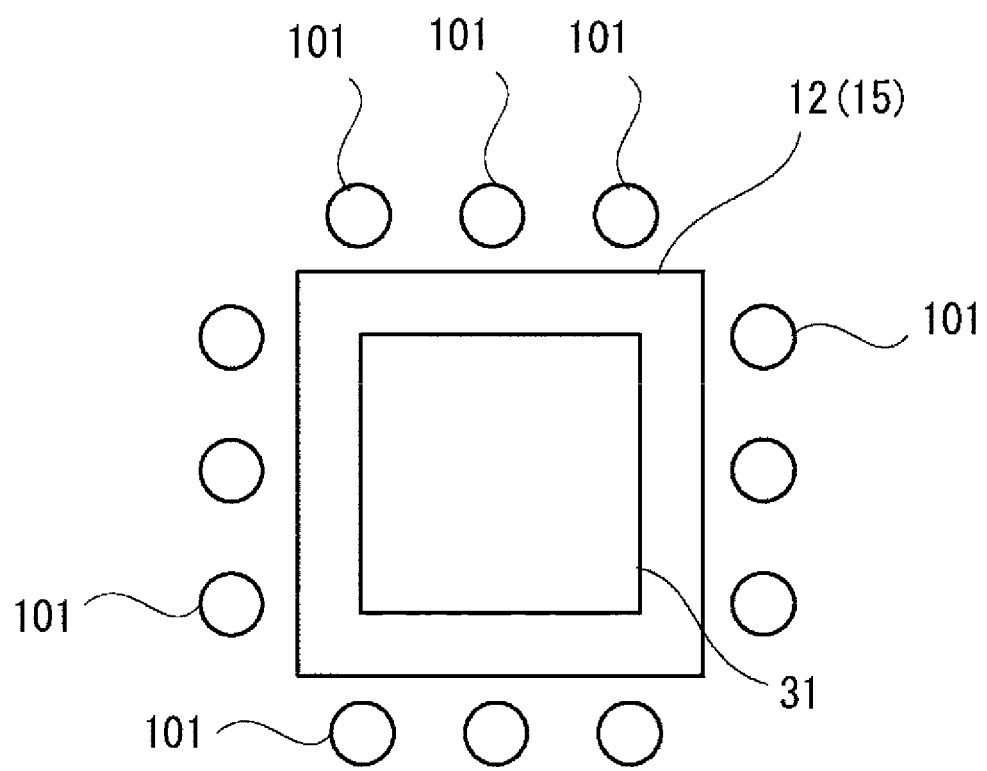
FIG. 10 schematically illustrates a modified example of a wind direction adjustment member illustrated in FIG. 9.

FIG. 10 schematically illustrates a modified example of the wind direction adjustment member illustrated in FIG. 9.

In FIG. 10, sub-ducts form openings 101 disposed in the front panel 8 around the air outlet 12 so as to surround an outer periphery of the air outlet 12.

The sub-ducts are connected to the air-conditioning apparatus 11. The air-conditioning apparatus 11 outputs conditioned airflows from the sub-ducts individually. The sub-ducts suction or blow out airflows individually.

By forming sub-ducts around the air outlet 12 formed by the air-conditioning duct 15 in this manner and suctioning or blowing out airflows through the sub-ducts, the blowing direction of the conditioned airflow from the air-conditioning duct 15 can be adjusted in a similar manner to a case in which the sub-ducts are connected to the air-conditioning duct 15.

Further, the positions in which the sub-ducts are connected to the air-conditioning duct 15 are not limited to the upper and lower sides of the holder 31, and the sub-ducts may be connected to the vicinity of an outlet of the air-conditioning duct 15 or behind the holder 31. Furthermore, these configurations may be combined such that sub-ducts are connected along the air-conditioning duct 15.

[Third Implementation]

Next, an example in which a video is displayed using a different arrangement to the first and second implementations will be described.

The following description focuses mainly on differences with the first implementation.

Figure 11:
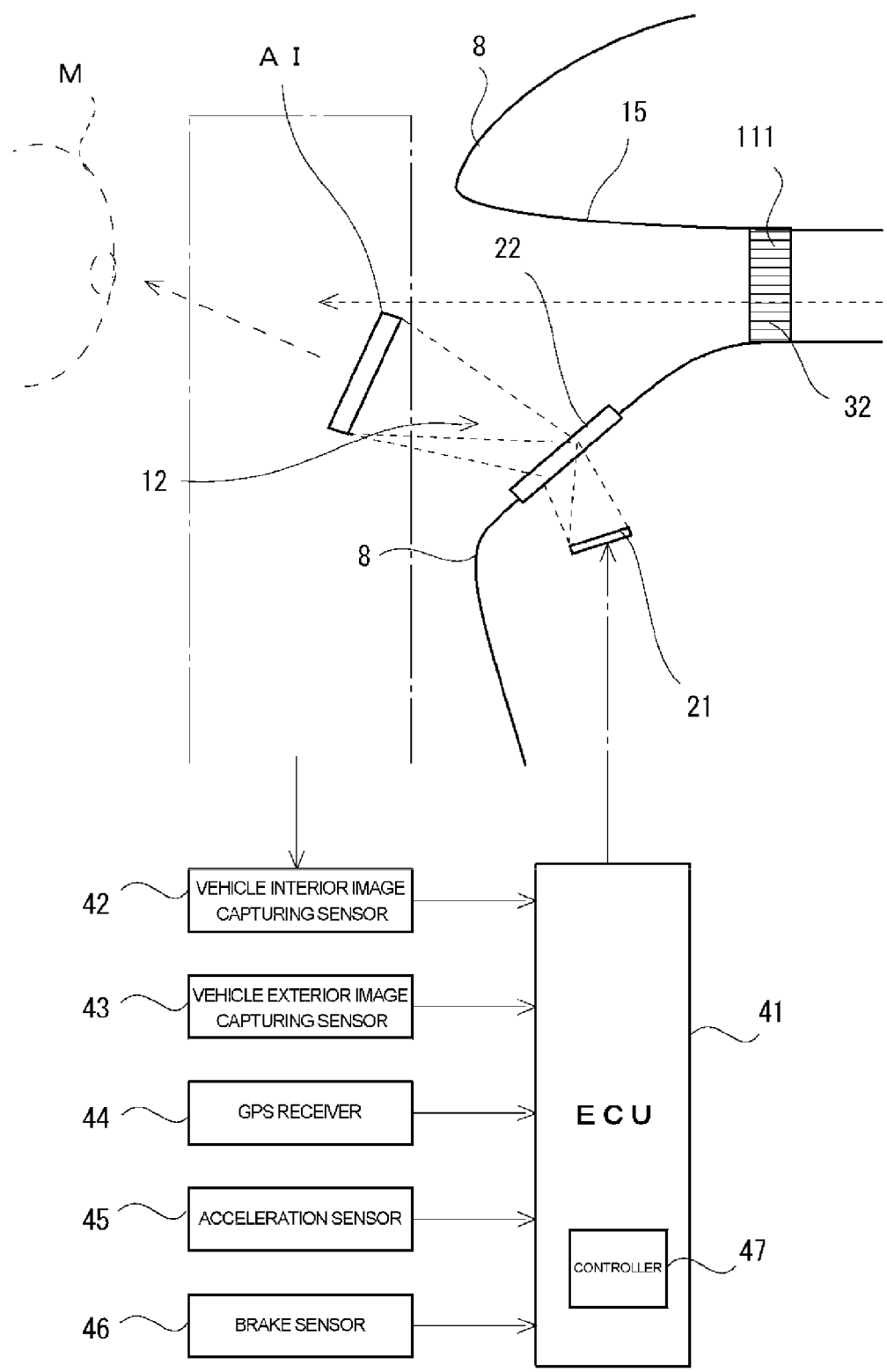
FIG. 11 schematically illustrates an air-conditioning facility provided in a front panel according to a third implementation of the present invention.

FIG. 11 schematically illustrates an air-conditioning facility provided in the front panel 8 according to a third implementation of the present invention.

On a cross-section illustrated in FIG. 11, the projection panel 22 is provided in a position near the air outlet 12 so as to be exposed to the inner surface of the air-conditioning duct 15. The display device 21 is disposed in the front panel 8 below the projection panel 22. Even when the projection panel 22 is disposed on the inner surface of the air-conditioning duct 15 in this manner, the floating image AI can be displayed in the upper portion of the front panel 8 between the air outlet 12 and the driver M. The driver M in the driving attitude seated in the front seat 6 can view the floating image AI displayed in the upper portion of the front panel 8 in front of the air outlet 12 without greatly shifting his/her frontward sightline. Further, the driver M can operate the automobile 1 or the in-vehicle devices by performing an operation in relation to the floating image AI displayed in front of the upper portion of the front panel 8 while remaining in the driving attitude seated in the front seat 6.

Furthermore, on the cross-section illustrated in FIG. 11, a slatted member 111 including the movable plates 32, which are capable of moving within the air-conditioning duct 15 in a perpendicular direction to the flow direction of the conditioned airflow, is provided in the air-conditioning duct 15 behind the position of the projection panel 22. Hence, the slatted member 111 including the movable plates 32 is provided so as not to block the path between the display device 21 and the occupant. The orientation of the conditioned airflow blown out of the air outlet 12 can be adjusted using the movable plates 32. Therefore, the conditioned air outlet 12 and the display device 21 can coexist in the upper portion of the front panel 8 without impairing the functions of the air-conditioning facility.

In this implementation, as described above, the projection panel 22 is embedded in the inner surface of the air-conditioning duct 15, and the slatted member 111 is disposed behind the projection panel 22 rather than the air outlet 12. Hence, a display member such as the projection panel 22 can be disposed in the air-conditioning duct 15. As a result, the floating image AI can be displayed in front of the air outlet 12 in the upper portion of the front panel 8 without being obstructed by the slatted member 111. Moreover, the conditioned airflow can pass over the projection panel 22 disposed in the air-conditioning duct 15.

Further, by adjusting the orientations of the movable plates 32 in the slatted member 111, the orientation of the conditioned airflow can be adjusted. With this implementation, therefore, similar effects to the first implementation can be obtained.

Figure 12:
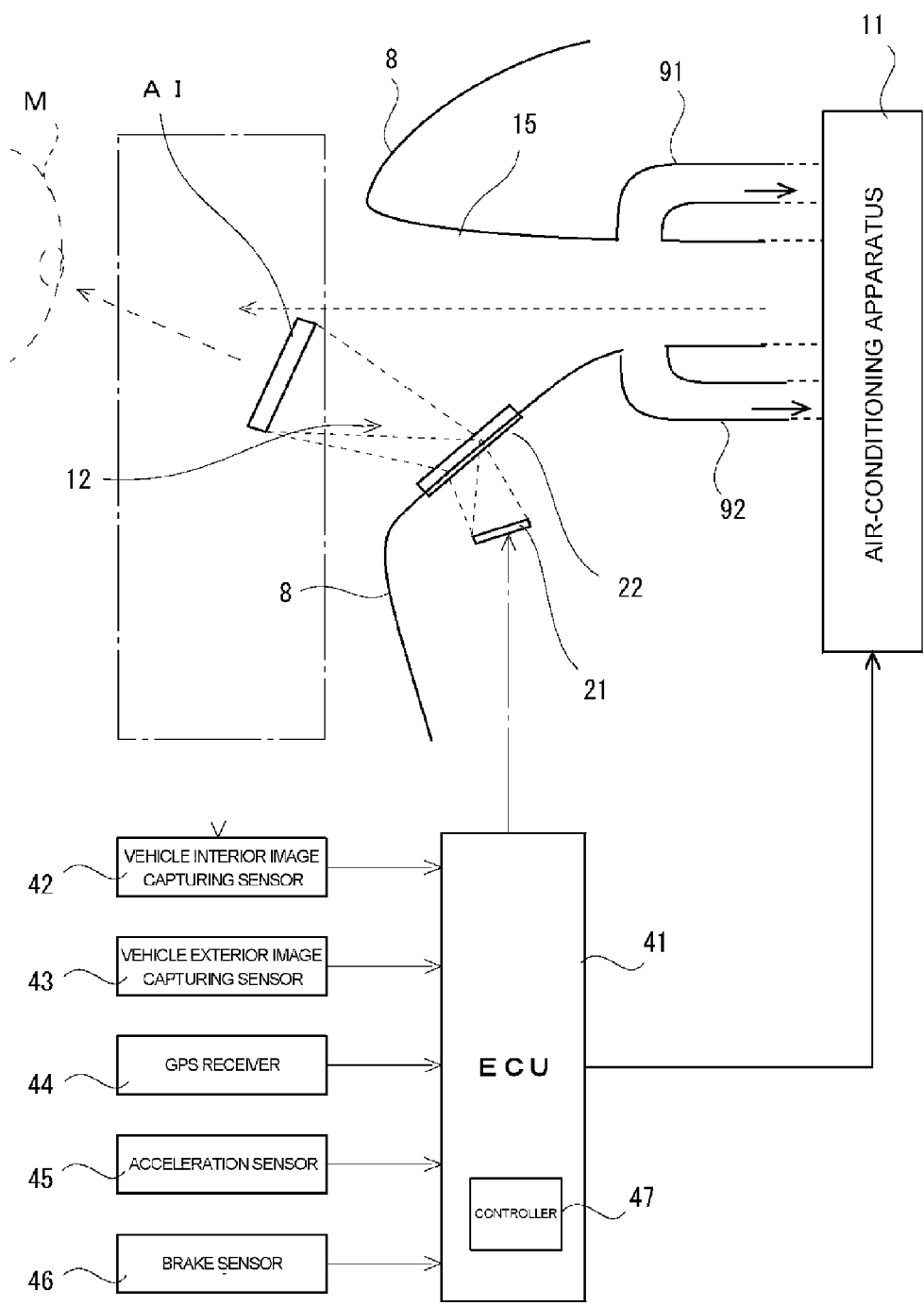
FIG. 12 schematically illustrates a modified example of a wind direction adjustment member illustrated in FIG. 11.

FIG. 12 schematically illustrates a modified example of the wind direction adjustment member illustrated in FIG. 11.

In FIG. 12, the upper sub-duct 91 and the lower sub-duct 92 are provided in place of the slatted member 111, similarly to the second implementation.

The upper sub-duct 91 and the lower sub-duct 92 communicate with the air-conditioning duct 15 behind the position of the projection panel 22. In other words, the upper sub-duct 91 and the lower sub-duct 92 communicate with the air-conditioning duct 15 in a part other than the projection panel 22.

Likewise in this case, the blowing direction of the conditioned airflow blown out so as to pass over the projection panel 22 disposed in the air-conditioning duct 15 can be adjusted in accordance with the airflows in the upper sub-duct 91 and the lower sub-duct 92.

Note that here, a case in which the conditioned airflow is adjusted in the up-down direction by joining the upper sub-duct 91 and the lower sub-duct 92 to the upper and lower sides of the inner surface of the air-conditioning duct 15 was described, but instead, the conditioned airflow may be adjusted in the left-right direction by joining the sub-ducts to the left and right sides of the inner surface of the air-conditioning duct 15.

Further, the positions in which the sub-ducts are joined to the air-conditioning duct 15 are not limited to positions behind the projection panel 22, and the sub-ducts may be joined to the air-conditioning duct 15 on the periphery of the projection panel 22. Furthermore, the sub-ducts may be joined to the air-conditioning duct 15 in the vicinity of the air outlet 12. Alternatively, sub-ducts may be joined to the air-conditioning duct 15 side by side in the flow direction of the airflow.

Moreover, the orientation of the conditioned airflow may be adjusted by combining the movable plates 32 with the sub-ducts.

The implementations described above are examples of preferred implementations of the present invention, but the present invention is not limited thereto, and may be subjected to various amendments and modifications within a scope that does not depart from the spirit of the invention.

For example, in the above implementations, the floating image AI is displayed between the air outlet 12 and the driver M by the combination of the projection panel 22 and the display device 21.

Alternatively, for example, the display device 21 may be provided so as to be exposed to a front surface of the holder 31 or exposed to the inner surface of the air-conditioning duct 15.

In the first and second implementations, the projection panel 22 refracts and transmits light from the image on the display device 21, and is provided in a lying condition relative to the conditioned airflow on the air outlet 12 side surface of the holder 31 having a substantially rhomboid sectional shape. The display device 21, meanwhile, is disposed in a lying condition relative to the conditioned airflow below the projection panel 22.

Alternatively, for example, the projection panel 22 alone may be provided on the holder 31 while the display device 21 is disposed in the front panel 8.

In the first and second implementations, the holder 31 has a substantially rhomboid sectional shape in which the first wing surface 51 and the second wing surface 52 formed in a projecting curved surface shape projecting in an orthogonal direction to the conditioned airflow flowing through the air-conditioning duct 15 oppose each other.

Alternatively, for example, the holder 31 may be formed with a polygonal sectional shape, or a circular or elliptical sectional shape.

Note that a substantially rhomboid sectional shape is obtained from a substantially die-shaped outer shape formed by aligning bottom surfaces of two arcs or a rod shape having a rhomboid cross-section, for example. With a substantially die-shaped outer shape, the conditioned airflow flows over the entire periphery thereof.

In the above implementations, the projection panel 22 reflects light from the image on the display device 21 internally a plurality of times and then transmits the light, whereby the floating image AI is formed in a position removed from the projection panel 22.

Alternatively, for example, the projection panel 22 may reflect light from the image on the display device 21 internally a plurality of times and then reflect the light in order to form the floating image AI in a position removed from the projection panel 22.

The invention claimed is:

1. A vehicle having an air-conditioning function and a display function, comprising:
    a front panel provided in front of an occupant in the vehicle;
    an air-conditioning duct that forms at least one air outlet through which a conditioned airflow is blown in an upper portion of the front panel;
    a wind direction adjustment member capable of adjusting the conditioned airflow blown out of the at least one air outlet such that the conditioned airflow flows from the at least one air outlet toward the occupant;
    at least one display member that displays information to the occupant, and
    a holder that is disposed in the air-conditioning duct at a distance from an inner surface of the air-conditioning duct such that the conditioned airflow flows around the holder, wherein
    the at least one display member comprises:
        a display device that displays an image by emitting light; and
        a projection panel that is provided at a distance from the display device, and that forms a floating image in a remote position by reflecting light from the image on the display device internally a plurality of times,
    the display member is provided in the air-conditioning duct or the at least one air outlet by providing at least the projection panel in the holder, and forms the floating image between the air outlet and the occupant, and
    the wind direction adjustment member is provided in a position that does not interfere with a display image to the occupant by the display member.

2. The vehicle having an air-conditioning function and a display function according to claim 1, wherein
    the holder has a substantially rhomboid sectional shape in which a first wing surface and a second wing surface oppose each other, the first wing surface and the second wing being formed in a projecting curved surface shape projecting in an orthogonal direction to the conditioned airflow flowing through the air-conditioning duct, and
    the wind direction adjustment member adjusts an orientation of the conditioned airflow blown out of the at least one air outlet by adjusting a balance between the conditioned airflow that flows along the first wing surface and the conditioned airflow that flows along the second wing surface.

3. The vehicle having an air-conditioning function and a display function according to claim 2, wherein
    the projection panel reflects light from the image on the display device internally a plurality of times and then transmits the light, and is provided in a flat condition relative to the conditioned airflow on an air outlet side surface of the holder having the substantially rhomboid sectional shape, and
    the display device is disposed in a flat condition relative to the conditioned airflow on a lower side of the projection panel.

4. The vehicle having an air-conditioning function and a display function according to claim 3, wherein the wind direction adjustment member includes at least one of:
    a movable plate provided in the air-conditioning duct or the air outlet to be capable of moving so as to vary a projection surface area intersecting the conditioned airflow, and
    a sub-duct that communicates with the air-conditioning duct or forms an opening in a part of the front panel surrounding the air outlet, and that suctions or blows out an airflow.

5. The vehicle having an air-conditioning function and a display function according to claim 2, wherein the wind direction adjustment member includes at least one of:
    a movable plate provided in the air-conditioning duct or the air outlet to be capable of moving so as to vary a projection surface area intersecting the conditioned airflow, and
    a sub-duct that communicates with the air-conditioning duct or forms an opening in a part of the front panel surrounding the air outlet, and that suctions or blows out an airflow.

6. The vehicle having an air-conditioning function and a display function according to claim 1, wherein the wind direction adjustment member includes at least one of:
    a movable plate provided in the air-conditioning duct or the air outlet to be capable of moving so as to vary a projection surface area intersecting the conditioned airflow, and
    a sub-duct that communicates with the air-conditioning duct or forms an opening in a part of the front panel surrounding the air outlet, and that suctions or blows out an airflow.

7. A vehicle having an air-conditioning function and a display function, comprising:
    a front panel provided in front of an occupant traveling in the vehicle;

an air-conditioning duct that forms at least one air outlet through which a conditioned airflow is blown in an upper portion of the front panel;
a wind direction adjustment member capable of adjusting the conditioned airflow blown out of the at least one air outlet such that the conditioned airflow flows from the at least one air outlet toward the occupant; and
at least one display member that displays information to the occupant, wherein
the at least display member comprises:
    a display device that displays an image by emitting light; and
    a projection panel that is provided at a remove from the display device, and that forms a floating image in a remote position by reflecting light from the image on the display device internally a plurality of times,
the at least one display member is provided in the air-conditioning duct or the at least one air outlet, and forms the floating image between the air outlet and the occupant,
the projection panel is provided in a position behind the air outlet as a part of the inner surface of the air-conditioning duct, and
the display device is disposed in the front panel in alignment with the projection panel, and
the wind direction adjustment member is provided in a position that does not interfere with a display image to the occupant by the display member.

8. The vehicle having an air-conditioning function and a display function according to claim 7, wherein the wind direction adjustment member includes at least one of:
    a movable plate provided in the air-conditioning duct or the air outlet to be capable of moving so as to vary a projection surface area intersecting the conditioned airflow, and
    a sub-duct that communicates with the air-conditioning duct or forms an opening in a part of the front panel surrounding the air outlet, and that suctions or blows out an airflow.

* * * * *